US005477424A

United States Patent [19]
Mocha

[11] Patent Number: 5,477,424
[45] Date of Patent: Dec. 19, 1995

[54] SELF-ILLUMINATED TELL-TALE

[76] Inventor: Douglas G. Mocha, P.O. Box 2144, St. Petersburg, Fla. 33731

[21] Appl. No.: 242,586

[22] Filed: May 13, 1994

[51] Int. Cl.⁶ ..................................................... F21V 7/04
[52] U.S. Cl. .............................. 362/32; 362/61; 362/800; 73/170.06
[58] Field of Search .............................. 362/31, 32, 26, 362/27, 61, 83.3, 800, 186, 191; 114/102; 116/200; 73/170.03, 170.06

[56]  References Cited

U.S. PATENT DOCUMENTS

| | | | | |
|---|---|---|---|---|
| 3,789,793 | 2/1974 | Keim | ........................................ | 116/200 |
| 3,799,106 | 3/1974 | Lamport | .............................. | 116/200 X |
| 4,522,069 | 6/1985 | Birnbaum | .............................. | 73/170.03 |

Primary Examiner—Stephen F. Husar
Attorney, Agent, or Firm—Joseph C. Mason; Ronald E. Smith

[57]  ABSTRACT

A tell-tale construction includes an optical fiber ribbon that emits light along its length to make the tell-tale visible at night. The optical fiber ribbon is housed between a pair of plastic strips having the size, flexibility, and weight of a conventional tell-tale, and the plastic strips are transparent or translucent so that the light emitted from the ribbon is visible through the plastic. In a preferred embodiment, a light emitting diode is modified by forming a slot in its leading end so that a first end of the optical fiber ribbon is insertable into the slot, in alignment with the light-emitting anode of the LED. In other embodiments, a central light source is employed and optical fibers deliver light to each tell-tale to eliminate the need for a light source associated with each tell-tale.

6 Claims, 4 Drawing Sheets

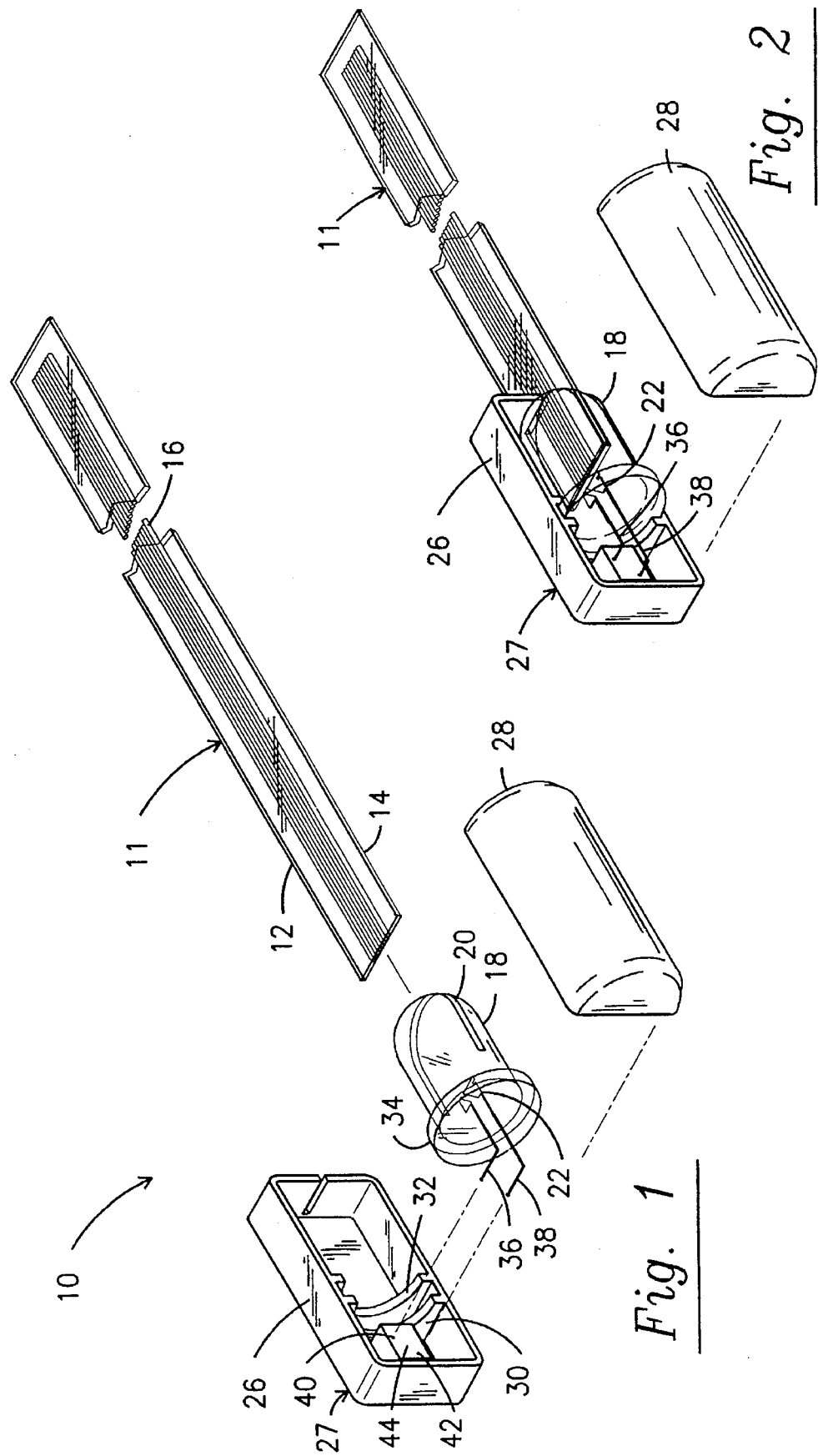

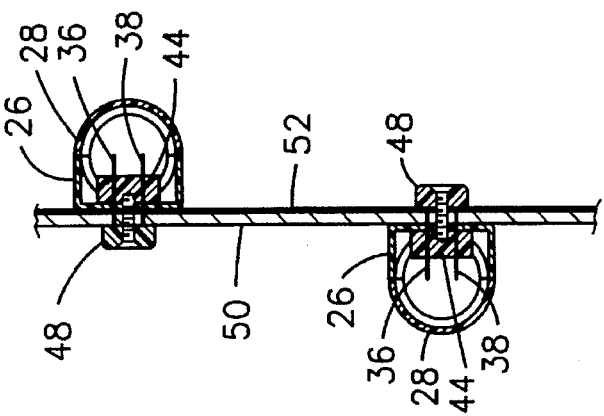
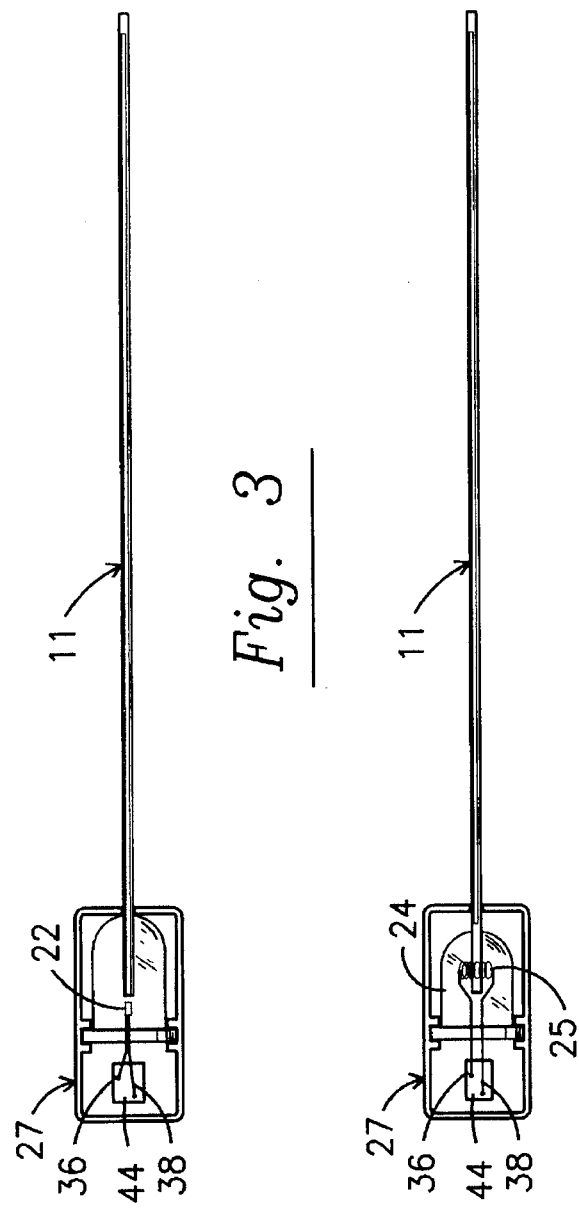
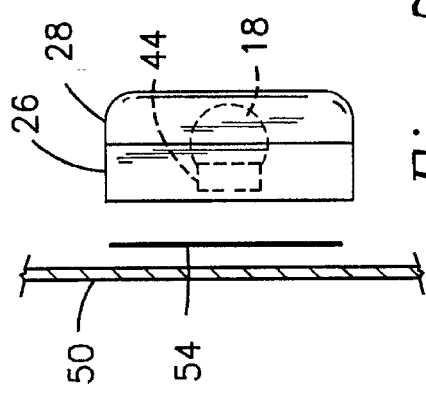
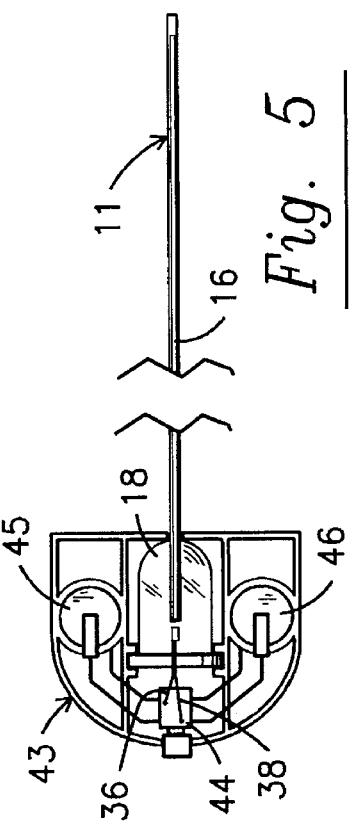

SELF-ILLUMINATED TELL-TALE

BACKGROUND OF THE INVENTION

1. Field of the Invention

This invention relates, generally, to tell-tales of the type used in sailboating. More particularly, it relates to a tell-tale that is visible at night.

2. Description of the Prior Art

Tell-tales are well-known devices used by sailors to determine prevailing wind conditions. Typically, they are formed of an elongate strip of lightweight, flexible material so that are easily displaced by wind. They are mounted at strategic places on a sailboat, such as the leading edge of a sail, so that they are easily visible; as they stream in the wind, they provide information about air flow over the sail, which is in most cases an air foil surface, so that the sail may be trimmed accordingly.

The primary shortcoming of the first tell-tales, and of most tell-tales currently in use, is that they are not visible under poor lighting conditions. Thus, where a race is being conducted that includes nighttime sailing, conventional tell-tales have little utility. Most sailors improvise a tell-tale illuminating means by directing a flashlight at the tell-tales time to time during the night, but this expedient provides only intermittent information unless the flashlight is used without interruption, and that, of course, is somewhat impractical.

Several inventors have provided other means for nighttime illumination of tell-tales. For example, Wheeler in U.S. Pat. No. 4,886,007 provides a small light source mounted near a tell-tale to illuminate it. Another illuminated wind indicator is disclosed in U.S. Pat. No. 4,481,505 to Thompson.

While the earlier means for illuminating tell-tales perform their intended function, they still include a few drawbacks. For example, when a light source that illuminates a tell-tale is mounted near the tell-tale, it provides a beam of light that illuminates the tell-tale when it is in or near a normal operating condition. When the tell-tale is displaced appreciably away from a normal operating position, it lies outside the fixed beam of light and is substantially invisible.

Another drawback of the known tell-tale lighting means is that the external lighting systems and their mounts are relatively bulky and expensive and often cease functioning because they are exposed to the elements.

An additional drawback of external lighting systems is they degrade night vision due to the excessive amount of light they produce, thereby lessening the Helmsman's ability to see wave patterns ahead and to windward.

Accordingly, there is a need for a tell-tale illumination means that illumines a tell-tale in all of its positions, and which does not require mounting means for holding external illumination devices. In view of the prior art considered as a whole at the time the present invention was made, however, it was not obvious to those of ordinary skill in this art how such means could be provided.

SUMMARY OF THE INVENTION

The longstanding but heretofore unfulfilled need for a means for illuminating a tell-tale in all of its positions is now fulfilled. The solution to the problem of nighttime tell-tale illumination includes the use of optical fiber technology.

Optical fibers, as is well-known, are used to transmit light. Significantly, the light can be made to travel in arcuate paths. In most applications, the light emerges from the distal end of the optical fiber. However, it is also known that an optical fiber can be abraded or etched along its length so that light is emitted along the extent of the abrasion or etching as well.

In the present invention, an optical fiber is abraded along its length so that light is emitted therefrom along said length. The optical fiber may then be sandwiched between a pair of elongate, flexible, durable yet light-in-weight members of transparent or translucent construction. It has been found that Mylar (trademark) plastic fulfills these requirements.

To make a tell-tale in accordance with the teachings of this invention, a length-abraded optical fiber is sandwiched between two strips of Mylar (trademark) plastic, or other equivalent material, that has been cut to the size of a conventional tell-tale. A conventional LED is then modified by forming a slot in a leading end thereof, and a first end of the optical fiber is inserted into said slot. Said first end is carefully aligned with the light-emitting anode of the LED so that substantially all of the light emitted by said anode is directed into the optical fiber at said first end.

The completed assembly is advantageously mountable in numerous locations. The first location is conventional, i.e., at the leading edge of a sail. However, two other mountings are novel. Specifically, in a second application of the invention, an elongate tell-tale is secured to the top edge of a spinnaker, along its entire extent, so that the helmsman can see the position of the entire top edge, i.e., the luff of said spinnaker at night. In a third application, the tell-tale is used on headsails and mainsails to highlight draft or camber of the foil. Thus, the novel tell-tale would be used somewhat like a conventional, non-illuminated color contrasting stripe commonly known as a "draft stripe." Specifically, the novel tell-tale could extend horizontally from the luff to the leach of a spinnaker or other sail. Additional applications of the novel tell-tale are also within the scope of this invention.

Thus it is understood that the primary object of the present invention is to provide a tell-tale that is easily seen at night or other low light conditions.

Another object is to eliminate the need for illumination devices that are external to the tell-tale.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is an exploded perspective view of an illustrative embodiment of the novel tell-tale;

FIG. 2 is a partially exploded perspective view of the parts depicted in FIG. 1;

FIG. 3 is a top plan view of the embodiment of FIGS. 1 and 2 when assembled;

FIG. 4 is a top plan view of a second illustrative embodiment when assembled;

FIG. 5 is a top plan, partially broken away view of a battery-powered embodiment;

FIG. 6 is an end view of a sail depicting how the novel tell-tales may be screw threadedly engaged to opposite sides of a sail;

FIG. 7 is an end view of a sail depicting an alternative attachment of a tell-tale to a sail;

DETAILED DESCRIPTION OF THE PREFERRED EMBODIMENT

Figure 8:
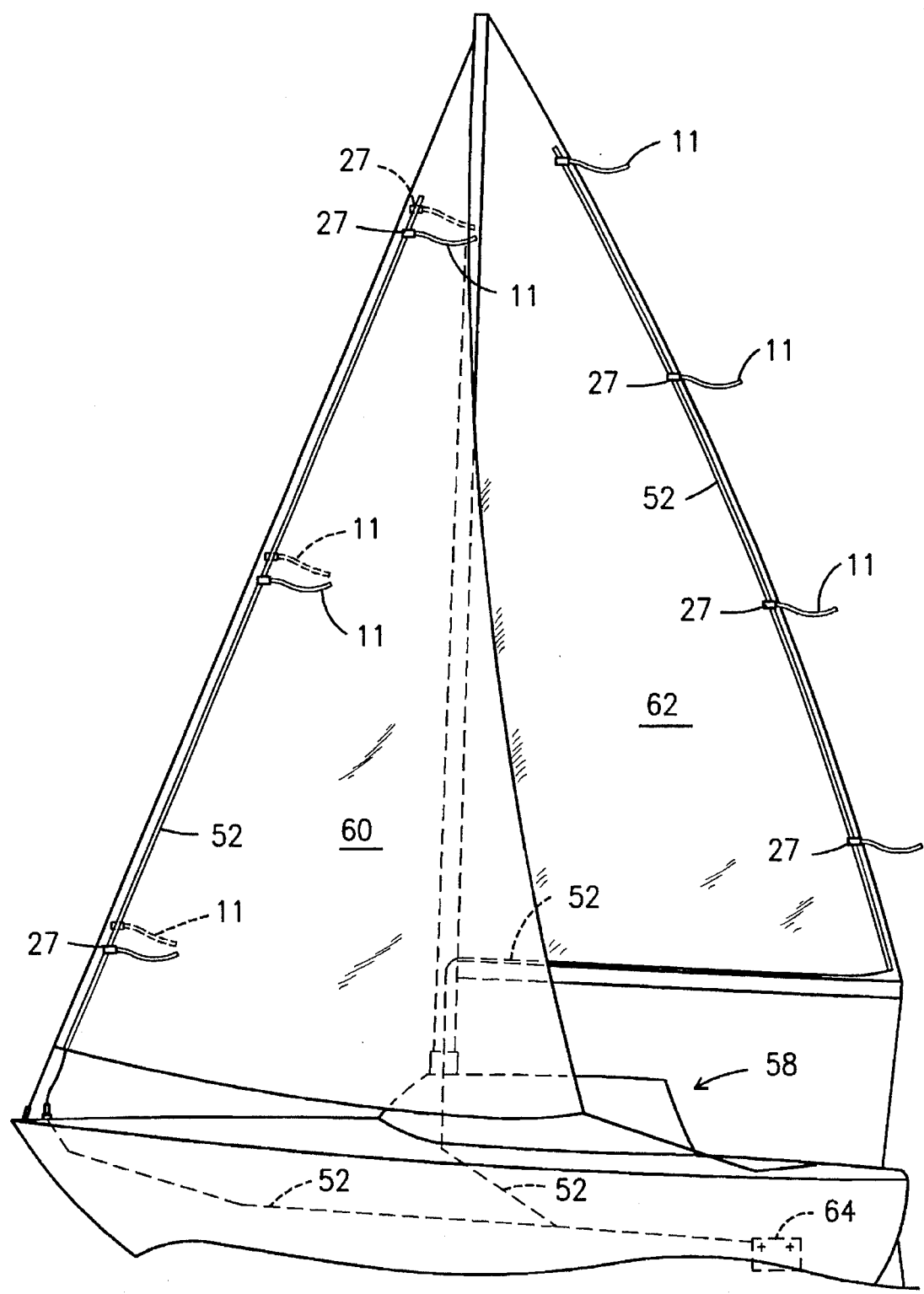
FIG. 8 is a side elevational view of a sailboat equipped the novel tell-tales and having a deck-mounted light source.

Referring now to FIG. 1, it will there be seen that an illustrative embodiment of a novel tell-tale is denoted as a whole by the reference numeral 10. Note that the tell-tale lies in a horizontal plane, i.e., in a plane normal to the plane of the sail; this reduces the possibility of static cling between the sail and tell-tale by presenting an edge of a tell-tale to the sail, as distinguished from a side.

Tell-tale assembly 10 includes first and second encasing members 12, 14 formed of Mylar (trademark) plastic, or other material having similar transparency, weight, flexibility, and durability. When secured to one another, encasing members 12, 14 collectively form a tell-tale 11 having the size, weight, and flexibility of a conventional tell-tale so that when exposed to wind, they respond in the same manner as a conventional tell-tale.

An optical fiber ribbon 16 of predetermined length is abraded, etched, or otherwise treated along its extent in a well-known way so that it emits light along its extent, and is housed in sandwiched, laminated relation between encasing members 12, 14. A suitable amount of adhesive is employed to secure encasing members 12, 14 to one another in housing relation to said treated optical fiber ribbon 16 to form a tell-tale 11. Note that ribbon 16 includes a plurality of parallel optical fibers. However, this invention is not limited to any particular number of optical fibers and in some applications a single treated optical fiber may emit sufficient light.

Light emitting diode housing 18 is of conventional construction, but must be modified to have utility in connection with the present invention. Specifically, a slot 20 is formed in its leading end; said slot 20 receives a first end of the optical fiber ribbon 16, and a suitable adhesive such as an epoxy is employed to retain said first end in said slot as may be gleaned from FIG. 2.

Anode 22 is the active element within housing 18 that emits light; accordingly, the first end of the treated optical fiber ribbon is positioned in closely spaced, axially aligned relation to said anode as perhaps best depicted in FIG. 3 to capture said light. If an incandescent bulb 24 having a filament 25 is employed, the first end of the treated ribbon is adhered to bulb 24 with an epoxy as depicted in FIG. 4.

As best disclosed in FIGS. 1 and 2, LED housing 18 is positioned within a housing 27 that includes parts 26 and 28. Part 26 includes a pair of closely spaced apart retainer walls 30, 32 that slidingly receive and retain therebetween flange 34 which is formed at the trailing end of housing 18. Part 28 includes a similar pair of walls, not shown, for the same purpose. Electrical leads 36, 38 are the positive and negative leads of the LED or other light-emitting element; they connect into sockets 40, 42, respectively, formed in receptacle 44. Power may be delivered to receptacle 44 in the conventional manner from an external source of power, or housing 27 may be enlarged to accommodate batteries. In FIG. 5, enlarged housing 44 accommodates batteries 45, 46; the electrical leads from the batteries to receptacle 44 are disclosed but not numbered to avoid cluttering the drawing.

A preferred means for attaching each housing 27 to a sail is disclosed in FIG. 6. Receptacle 44 has an internally threaded blind bore formed therein for screw threadedly receiving a screw 48. A grommeted aperture is formed in sail 50 where the placement of a tell-tale is desired, and screw 48 and base 26 of housing 27 are placed on opposite sides of sail 50 at said grommeted opening and the sail is sandwiched therebetween when the screw is threaded into the bore formed in receptacle 44. This enables facile placement of the tell-tale on either side of sail 50 as depicted in FIG. 6.

Wire 52 is an insulated conductor which delivers electrical power from a remote power source to each receptacle 44.

As depicted in FIG. 7, a double-sided adhesive tape 54 provides an alternate fastening means which avoids forming grommeted apertures in the sail but which may not secure the tell-tales as well as the attachment means of FIG. 6.

FIG. 8 depicts a first deployment of the novel tell-tales on a sailboat 58 at the leading edge of a jib 60 and at the trailing end of a mainsail 62; note how wire 52 delivers electrical current to each housing 27 from remote battery 64.

Figure 10:
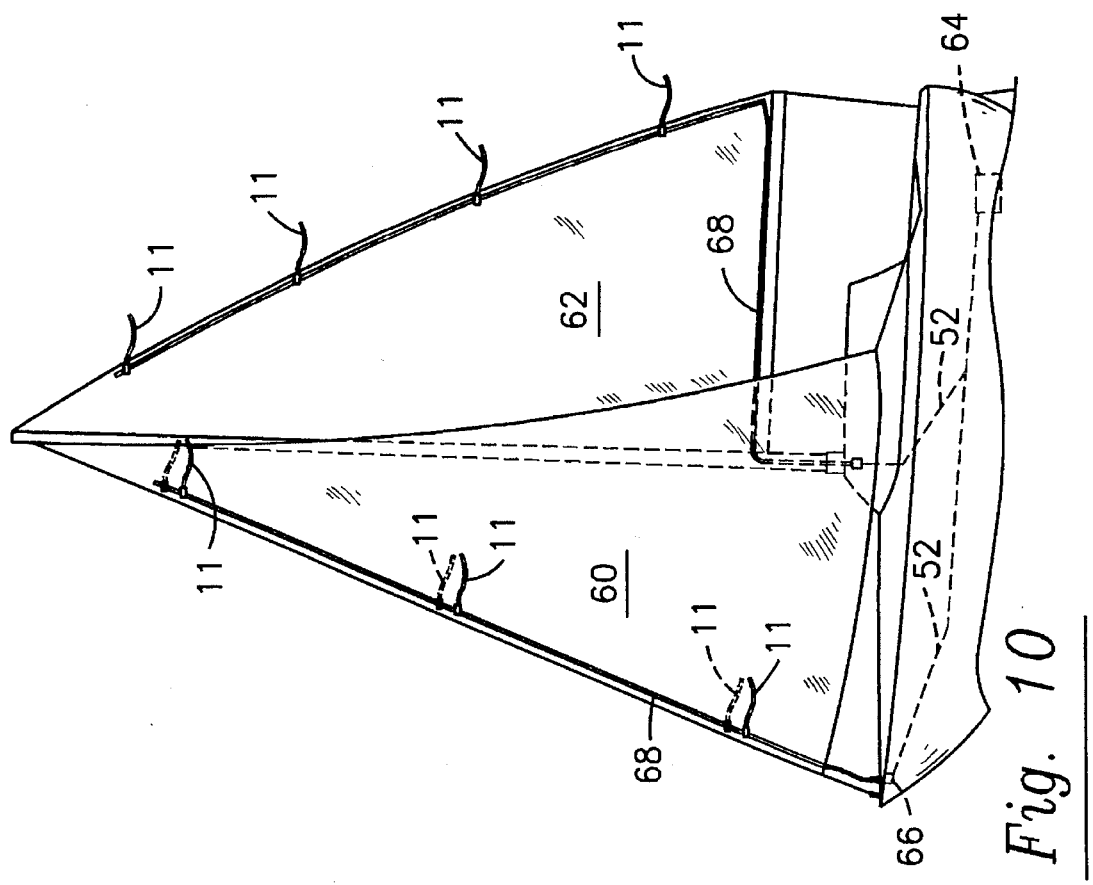
FIG. 10 is a side elevational view of a sailboat equipped with the novel tell-tales and having light sources mounted below the deck.
Figure 9:
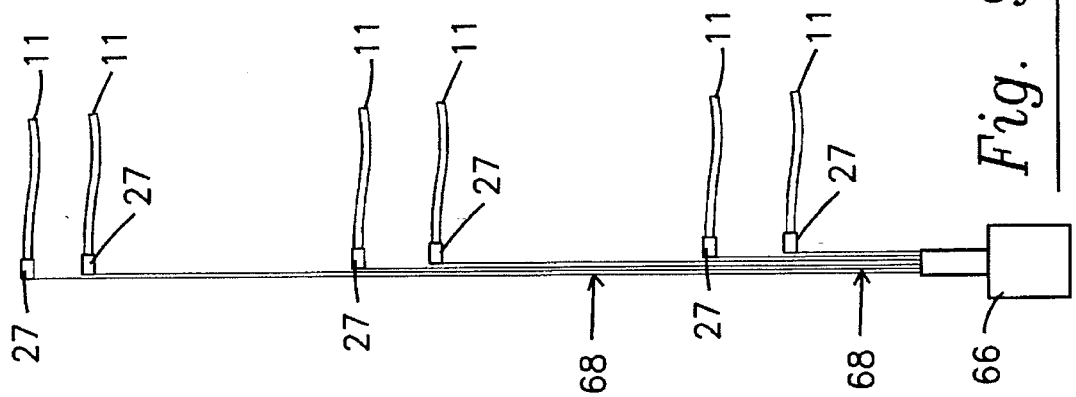
FIG. 9 is a side elevational view of a coupler having multiple optical fibers of differing lengths for use in the embodiment of FIG. 8.

Electrical wires 52 do not extend above the deck in the embodiment of FIG. 10. Instead, conductors 52 terminate at a light source 66, two of which are disclosed in this particular embodiment. The light is then distributed to each ribbon 16 in the manner disclosed in FIG. 9. Specifically, electrical power is delivered from battery 64 by conductor 52 to light source 66. Light source 66 produces substantially more light than LED 18 or bulb 24. A plurality of untreated optical fibers, collectively denoted 68, are secured to light source 66 in much the same way as treated optical fiber ribbon 16 is mounted in closely spaced relation to anode 22 of LED 18 or filament 25 of bulb 24, i.e., the respective first ends thereof are mounted in light-receiving relation to said light source 66. Untreated optical fibers 68 have varying lengths as depicted in FIG. 9 so that the light carried by each fiber is delivered to each housing 27 of tell-tales 11. Specifically, said light is delivered to a point near the first end of each ribbon 16. In this way, multiple small light sources and wires leading to each are eliminated in favor of one or more central light sources 66. This may increase the efficiency and reliability of the system while reducing its cost.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A tell-tale assembly, comprising:

an optical fiber of predetermined length;

said optical fiber being treated along said predetermined length so that it emits light along said predetermined length;

a pair of optical fiber housing members of elongate, flexible, light-in-weight, and transparent construction;

said optical fiber housing members having a common size and shape, said common size and shape being collectively substantially equal to a size and shape of a tell-tale;

said optical fiber being sandwiched between said optical fiber housing members;

a light source;

a light source housing;

a first end of said optical fiber positioned in close proximity to said light source to receive light therefrom;

whereby said optical fiber is visible under low light conditions due to light from said light source being emitted along the length of said optical fiber and being visible through said optical fiber housing members.

2. The assembly of claim 1, wherein said light source is a light emitting diode and wherein said light source housing is a light emitting diode housing, wherein a slot is formed in said light emitting diode housing to receive said first end of said optical fiber so that said first end is positioned in close proximity to said light emitting diode, and wherein an adhesive means secures said first end of said optical fiber within said slot.

3. The assembly of claim 1, wherein said light source is an incandescent bulb, and wherein a first end of said optical fiber is adhered to a leading end of said incandescent bulb.

4. The assembly of claim 1, further comprising a battery means disposed within said light source housing.

5. The assembly of claim 1, further comprising a remote power source and conductor means for delivering power to said light source from said remote power source.

6. The assembly of claim 1, wherein said optical fiber housing members are disposed in a plane normal to a plane of a sail with which said optical fiber housing members are associated.

* * * * *